Dec. 4, 1928.
H. C. MADSEN
1,694,070
TOY JIG SAW
Filed Nov. 10, 1927
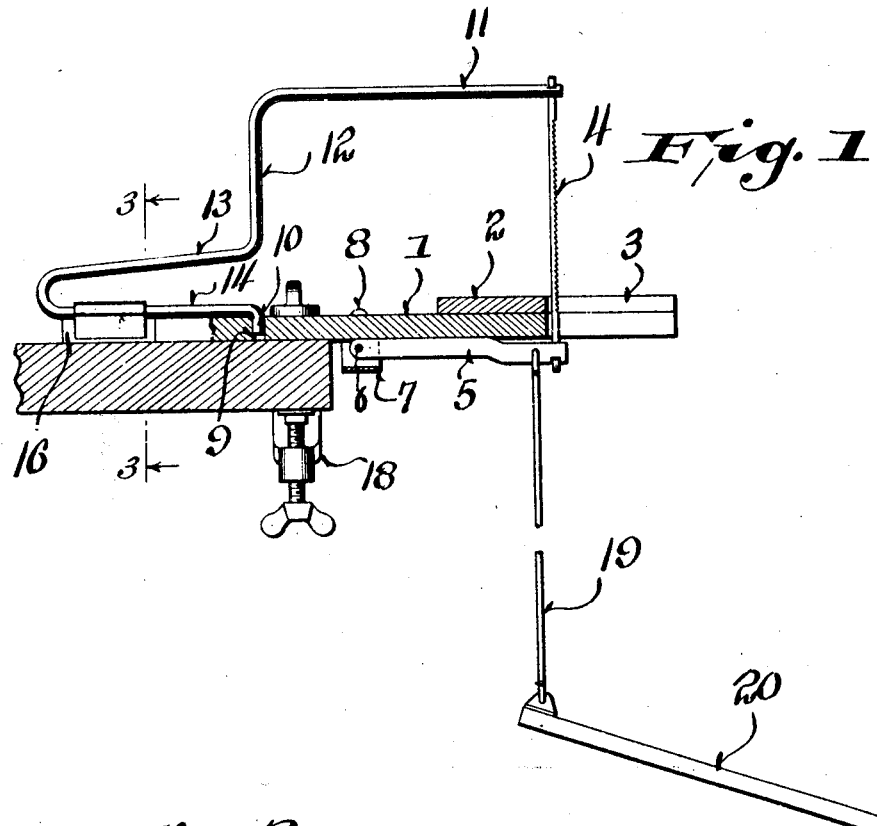

Patented Dec. 4, 1928.

1,694,070

UNITED STATES PATENT OFFICE.

HANS C. MADSEN, OF MILWAUKEE, WISCONSIN.

TOY JIG SAW.

Application filed November 10, 1927. Serial No. 232,348.

This invention relates to toy jig saws.

Objects of this invention are to provide a novel form of toy jig saw which is so constructed that it may be used for actual work and nevertheless may be made at a remarkably small cost.

Further objects are to provide a toy jig saw in which the blade rocks forwardly adjacent its upper end as it moves down and which rocks rearwardly adjacent its upper end as it moves up so as to clear the work on the up stroke and thus permit free operation of the device without hanging to the work on the upstroke.

Further objects are to provide a device which does not require any elaborate pedal mechanism, but which may be operated by a very simple type of pedal merely having one end resting upon the floor, and to so construct the device that it may be readily clamped to a table top or any other suitable support.

An embodiment of the invention is shown in the accompanying drawings in which:

Figure 1 is a central sectional view through the device with parts being shown in full;

Figure 2 is a plan view of the device;

Figure 3 is a sectional view on the line 3—3 of Figure 1.

Referring to the drawings, it will be seen that the device comprises a body portion 1 which may consist of an elongated board, preferably of oak or hard material. This body portion carries a work table 2 which is secured thereto in a rigid manner. The front end of the board or body portion and of the work table, which also may be of wood, are provided with a slot 3 for the jig saw 4. The lower end of the jig saw is detachably secured to the forward end of a small rigid lever 5. The rear end of this lever is pivoted, as indicated at 6, to a U-shaped clip 7. This clip is secured to the body portion 1 by means of rivets 8. The body portion is provided with a hole 9, as shown in Figure 1, into which the downwardly turned end 10 of the spring structure for supporting the upper end of the blade is adapted to be positioned. This spring structure is an integral piece of metal which may take the shape of a round rod, for instance, although obviously other shapes could be used. It is provided with a substantially straight upper portion 11, a downwardly extending portion 12, a rearwardly extending portion 13, and a forwardly extending bottom portion 14, as shown most clearly in Figure 1. This provides two points of bending, namely, in the upper portion 11 and in the portion 13, as well as a slight bending in the portion 12. Thus, it will be seen that the downward motion of the saw causes it to rock forwardly at its upper portion and at its lower portion causes it to rock inwardly about the pivot point 6 of the lower lever. In other words, the general point about which the upper end pivots is considerably rearwardly of the pivot point 6 for the lower lever 5. Thus, the saw is caused to rock forwardly adjacent its upper end on the downward stroke and to rock rearwardly adjacent its upper end on the upstroke, to thus clear the work.

In order to securely hold the upper frame or resilient support for the upper end of the saw, a clip 15 is clamped about the portion 14 and inwardly against slanting faces 16 adjacent the rear of the body portion 1. This clip is spaced from the downturned portion 10 and thus locks the parts against either lateral or longitudinal rocking motion and provides a very secure attachment therefor.

The device may be held to the table top 17 or other suitable support in any desired manner, as by means of the simple type of clamp 18.

It is to be noted that the lever 5 is connected by means of a cord or any suitable member 19, to a pedal 20. The pedal 20 has its rear end resting upon the floor and may be readily operated by the foot.

It is apparent that the device may be very cheaply manufactured and may be readily operated by a child.

It is to be understood that the saw 4 may be detachably attached to the lever 5 and the upper member 11 in any suitable manner.

It is to be noted also that the device is extremely simple and has very few parts.

Although the invention has been described in considerable detail, such description is intended as illustrative rather than limiting as the invention may be variously embodied and as the scope of such invention is to be determined as claimed.

I claim:

1. A toy jig saw comprising a body portion, a work table secured thereto and provided with a slot, a saw extending through said slot, a rigid lower lever pivoted adjacent the central portion of the body portion and positioned beneath said body portion and detachably attached to the lower end of said saw, an integral resilient member having a free end detachably attached to the upper end of said saw, said member extending rearwardly and thereafter downwardly and having a rearwardly extending looped portion attached to said body portion, and means for operating the lower lever.

2. A toy jig saw comprising a body portion having a work table provided with a slot, a saw extending through said slot, a lower lever positioned below said body portion and being relatively short, a resilient lever-like member positioned above said body portion and having its free end attached to the upper end of said saw, said resilient member rocking about a point materially rearwardly of the pivot point of said lower lever, said upper lever-like member having a downturned portion fitting within said body portion, a clip binding said lever-like member to said body portion, and means for operating said lower lever.

In testimony that I claim the foregoing I have hereunto set my hand at Milwaukee, in the county of Milwaukee and State of Wisconsin.

HANS C. MADSEN.